(12) United States Patent
Smith et al.

(10) Patent No.: US 10,107,397 B2
(45) Date of Patent: Oct. 23, 2018

(54) PISTON UNIT AND HYDROSTATIC RADIAL PISTON MACHINE

(71) Applicant: Robert Bosch GmbH, Stuttgart (DE)

(72) Inventors: Samuel Smith, Highland (GB); Geoffrey Kermode, Fife (GB); Alexander Graham McIntosh, West Lothian (GB)

(73) Assignee: Robert Bosch GmbH, Stuttgart (DE)

( * ) Notice: Subject to any disclaimer, the term of this patent is extended or adjusted under 35 U.S.C. 154(b) by 194 days.

(21) Appl. No.: 14/247,034

(22) Filed: Apr. 7, 2014

(65) Prior Publication Data

US 2014/0298988 A1    Oct. 9, 2014

(30) Foreign Application Priority Data

Apr. 9, 2013    (DE) .................... 10 2013 206 192

(51) Int. Cl.
*F01B 1/06* (2006.01)
*F16J 1/02* (2006.01)

(52) U.S. Cl.
CPC ............... *F16J 1/02* (2013.01); *F01B 1/0603* (2013.01)

(58) Field of Classification Search
CPC ......... F01B 13/061; F04B 1/0417; F16J 1/02; Y10T 29/49263
USPC .......................................................... 92/178
See application file for complete search history.

(56) References Cited

U.S. PATENT DOCUMENTS

| 4,918,806 | A | * | 4/1990 | Watanabe | B23P 15/10 148/220 |
| 8,146,483 | B2 | * | 4/2012 | Lemaire | F03C 1/0406 92/172 |
| 2003/0063980 | A1 | * | 4/2003 | Doll | F01C 21/08 417/221 |
| 2007/0113802 | A1 | * | 5/2007 | Mihara | F02F 3/12 123/41.35 |
| 2009/0026712 | A1 | * | 1/2009 | Kawanishi | F16J 9/26 277/443 |
| 2010/0037864 | A1 | * | 2/2010 | Dutt | F01L 1/08 123/508 |
| 2011/0155090 | A1 | * | 6/2011 | Barbezat | C23C 4/11 123/193.2 |
| 2011/0297118 | A1 | * | 12/2011 | Izawa | C23C 4/12 123/193.5 |
| 2012/0048427 | A1 | * | 3/2012 | Kubota | C21D 1/06 148/218 |

FOREIGN PATENT DOCUMENTS

| DE | 40 37 455 C1 | 2/1992 |
| DE | 10 2010 032 058 A1 | 1/2012 |
| WO | WO 2011131269 A1 * | 10/2011 ............ F04B 53/14 |

OTHER PUBLICATIONS

Kane Brian, Piston for radial piston machine(translation), Feb. 2011, pp. 1-5.*
Surface roghness parameters and texture, ASME B46.1-1995; DIN 4776; pp. 1-2; 1995.*

* cited by examiner

*Primary Examiner* — Michael Leslie
*Assistant Examiner* — Abiy Teka
(74) *Attorney, Agent, or Firm* — Maginot, Moore & Beck LLP

(57) ABSTRACT

A radial piston machine includes at least one piston unit with a piston and at least one rolling element rotatably mounted in a rolling element receptable of the piston. The piston of the piston unit is polished.

2 Claims, 2 Drawing Sheets

PISTON UNIT AND HYDROSTATIC RADIAL PISTON MACHINE

This application claims priority under 35 U.S.C. § 119 to patent application no. DE 10 2013 206 192.7 filed on Apr. 9, 2013 in Germany, the disclosure of which is incorporated herein by reference in its entirety.

BACKGROUND

The disclosure relates to a piston unit and to a hydrostatic radial piston machine having a piston unit of this kind.

A hydrostatic radial piston machine of the type in question, which is known from DE 40 37 455 C1 for example, has a rotor which is embodied as a cylinder block and in which a multiplicity of piston units are guided for movement in the radial direction. Each of these piston units has a piston, which is guided in a cylinder bore of the cylinder block and the end portion of which, which protrudes from the cylinder block in the radial direction, is supported via a rolling element on a cam ring forming part of the housing of the radial piston machine, with the result that the pistons perform a stroke in accordance with a cam curve on this cam ring.

It has been found that conventional hydrostatic radial piston machines of this kind are subject to a not inconsiderable friction in the region of the sliding surfaces, the effect of such friction being, in particular, to reduce the required starting torque when the radial piston machine is used as a radial piston motor and thus to impair the efficiency thereof.

To overcome this disadvantage, a pocket supplied with a pressure medium can be provided in the region of contact between the pistons and the rolling element, thus ensuring that the rolling element is supported hydrostatically and hence that the friction between the pistons and the rolling element is significantly reduced. Such a solution is shown in DE 10 2010 032 058 A1, for example. In order to avoid tilting of the piston within the cylinder bore, the piston can be designed as a stepped piston, ensuring that said piston is guided in the cylinder block over a large guidance length and nevertheless permitting a large effective piston cross section.

In the abovementioned publication, there is a proposal to avoid leakage from the region of the hydrostatic bearing by making a holding portion of the piston, along which the rolling element is held, elastic, thus ensuring that the holding portion as it were "hugs" the rolling element and hence reduces a gap that would allow leakage.

Despite these design measures, it has been found that the starting torque of such radial piston machines and piston units when new, i.e. before the radial piston machine has been running, is poorer than in the case of a radial piston machine which has already been in service for a number of hours.

In contrast, it is the underlying object of the disclosure to provide a piston unit and a radial piston machine embodied with a piston unit of this kind in which the starting torque when new is improved over conventional solutions.

SUMMARY

This object is achieved by a piston unit having the features of the disclosure and by a radial piston machine having the features of the disclosure.

According to the disclosure, the piston unit has a piston having a rolling element receptacle. In the solution according to the disclosure, the piston is polished in the installed state, i.e. before the piston unit has been run in or before the radial piston motor has been run in. Surprisingly, it has been found that, by virtue of this polishing, the starting torque of a new radial piston machine that has not been run in is significantly below that of the conventional radial piston machines, allowing the starting efficiency to be improved by 55% to 70% over conventional solutions by means of the solution according to the disclosure. Such a low starting torque can only be achieved with conventional solutions after a run-in cycle, which is provided during the assembly of the radial piston machine, at the end of the production line. The disclosure thus makes it possible to dispense with this run-in cycle or to considerably shorten it, thereby very considerably reducing the manufacturing outlay for the piston unit and the radial piston machine embodied therewith over conventional solutions.

The polishing of the piston can be performed by a conventional manufacturing method which ensures a sufficiently high surface finish on the piston to be polished. Vibration polishing has been found to be particularly well suited.

In an advantageous development of the disclosure, the polished surface has a maximum peak-to-mean-line height Rpmax of 0.20±0.05 μm, this figure being composed of the nominal dimension to be produced and of a manufacturing tolerance. A piston surface with such a surface finish results in a particularly low friction coefficient and thus in a significant increase in the starting efficiency of the piston unit or of a radial piston machine fitted therewith.

It has proven advantageous if the polished surface has a mean roughness Ra of 0.03±0.01 μm, this figure being composed of the nominal dimension to be produced and of a manufacturing tolerance. By means of such a high surface accuracy it is possible to further reduce the friction coefficient.

The starting efficiency of a piston unit can be increased even further if the polished surface has a reduced peak height Rpk of 0.04±0.02 μm, this figure being composed of the nominal dimension to be produced and of a manufacturing tolerance.

As an advantageous possibility for a further reduction in the starting resistance of a piston unit, provision can be made for the polished surface to have a core peak to valley height Rk of 0.10±0.01 μm, this figure being composed of the nominal dimension to be produced and of a manufacturing tolerance.

An advantageous development of the disclosure envisages that the polished surface has a mean score depth Rvk of 0.08±0.02 μm, this figure being composed of the nominal dimension to be produced and of a manufacturing tolerance.

It is advantageous if the polished surface has a material ratio Rmr of 30%±10%, measured at a cutting depth of −0.05 μm. This value Rmr referred to as the material ratio is defined in DIN EN ISO 4287 and describes the distribution of material of a surface roughness profile from the outside downward.

In an advantageous variant embodiment of the disclosure, the rolling element can be embodied as a roller and can likewise be polished.

In a particularly preferred development of the disclosure, the composite material used as a bearing material for the rolling element receptacle is a plastics and/or metal composite material. A composite material of this kind is distinguished by easily set properties in respect of the wear resistance and sliding properties thereof. The combination of the polished rolling element and the bearing material used, comprising a plastics and/or metal composite material, has proven particularly advantageous here.

In an advantageous development of the disclosure, the plastics and/or metal composite material of the bearing material has a PEEK/PTFE matrix. The use of a bearing material with a PEEK/PTFE matrix is distinguished by particularly good wear resistance and a particularly low friction coefficient. Moreover, this bearing material is excellently suited to use in highly dynamic applications. One example of a bearing material of this kind is the antifriction material HX™ from GGB Bearing Technology, which has proven particularly appropriate for the disclosure.

For particularly advantageous manufacture or production of the piston, it has proven advantageous if the rolling element receptacle is embodied as a separate bearing shell, i.e. a bearing shell formed separately from the piston. In this way, the bearing material having the PEEK/PTFE matrix or the entire piston can be manufactured individually and then assembled at even lower cost.

A radial piston machine according to the disclosure has a cylinder block in which at least one piston unit according to the disclosure having a polished piston is guided.

In a preferred illustrative embodiment of the disclosure, the piston-receiving cylinder bore of the cylinder block is provided with an unpolished surface layer. In other words, in the tribological system comprising the piston and the cylinder, only the piston surface is polished, while the cylinder surface is treated by the conventional method.

A conventional surface treatment method of this kind can be a surface treatment by nitrocarburization, for example. In this process, alkali metal cyanates are dissolved in a molten salt bath, into which the respective workpiece, in the present case the cylinder block, is dipped. During this process, the cyanate is converted to a carbonate at the workpiece surface and thus a wear resistant surface layer distinguished by very good corrosion resistance is built up. Nitrocarburization is followed by an oxidation treatment in a cooling bath (quenching), during which a dark iron oxide layer (magnetite) is formed on the workpiece surface. In a subsequent operation, the workpiece surface is then polished and then subjected once again to an oxidation treatment in order to improve corrosion resistance, which is negatively affected by the polishing. Such a surface treatment is known as the QPQ® method (quenching, polishing, quenching). The second oxidation treatment in turn produces a rough and relatively porous magnetite surface which considerably improves the formation of a lubricating film in interaction with the polished piston surface, thus ensuring adequate lubrication, even in the case of unfavorable operating conditions and very small quantities of lubricant.

BRIEF DESCRIPTION OF THE DRAWINGS

A preferred illustrative embodiment of a piston unit according to the disclosure and of a radial piston machine embodied with a piston unit of this kind is explained in greater detail below with reference to schematic drawings, in which.

DETAILED DESCRIPTION

Figure 1:
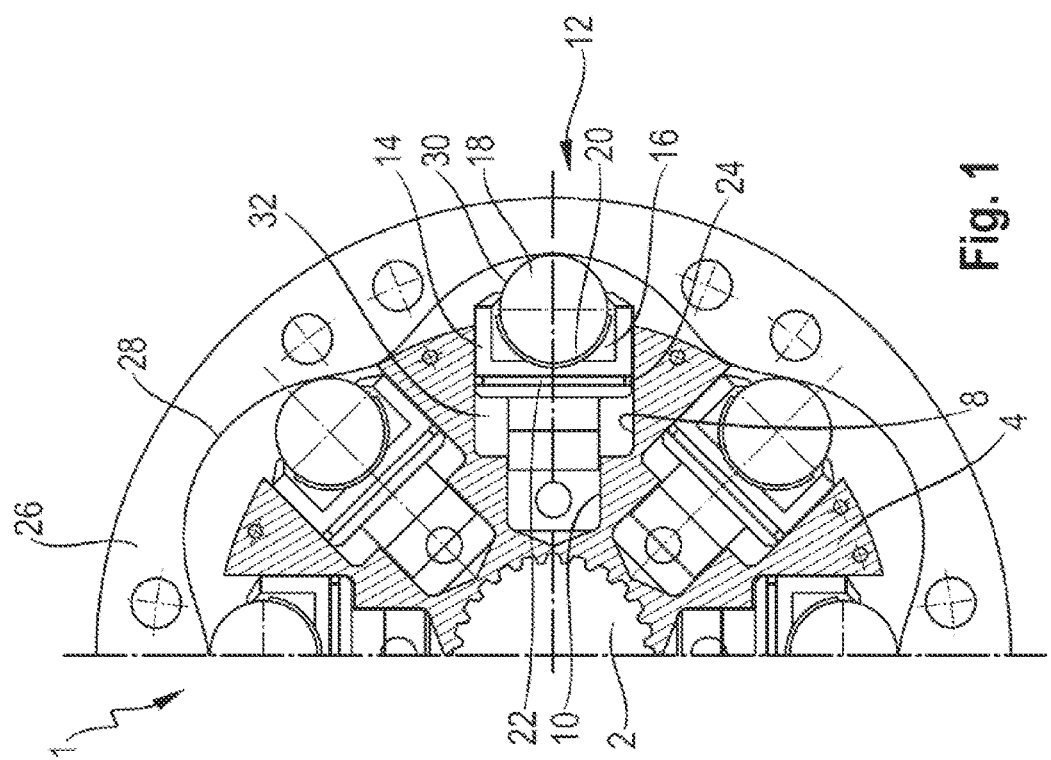
FIG. 1 shows half of a radial piston machine with piston units according to the disclosure in a radial section.

FIG. 1 shows an illustrative embodiment of a radial piston machine 1 described at the outset in a radial section. In this illustrative embodiment, the radial piston machine 1 is a hydrostatic radial piston motor with piston support at the outside.

The radial piston machine 1 has a centrally arranged shaft 2. This is driven by a revolving rotor 4 or cylinder block, in which a multiplicity of cylinders 6 is formed. In the illustrative embodiment shown, the radial piston machine 1 has eight cylinders 6, of which only three are shown completely and two others are each shown as halves in FIG. 1. The cylinders 6 are arranged radially or in a star shape around the shaft 2. Each cylinder 6 is formed by a main bore 8 and a guide bore 10 set back radially in a stepped manner, in each of which a piston unit 12 is accommodated for axial movement.

Each of the piston units 12 has a piston 14, which is a stepped piston in this illustrative embodiment. At an outer end in the radial direction, each piston 14 has a rolling element receptacle 16, in which a rolling element 18 designed as a roller is rotatably mounted. A bearing shell 20 for the rolling element 18 is provided in the rolling element receptacle 16. The bearing shell 20 is secured on the piston 14 and is manufactured from a bearing material which has a PEEK/PTFE matrix. Each piston 14 furthermore has an encircling groove 22 in which a piston ring 24 serving as a sealing element is accommodated.

The radial piston machine 1 furthermore has a cam ring 26 representing part of a housing, which has an undulating cam curve 28 arranged so as to revolve around the rotor 4 and thus also around the cylinders 6 together with the piston units 12. This arrangement enables the rolling elements 18 to be supported on the cam curve 28 of the cam ring 26 and to roll along the cam curve 28 during a rotary motion of the rotor 4. As a result, the piston units 12 perform an oscillating motion within the cylinders 6.

Figure 2:
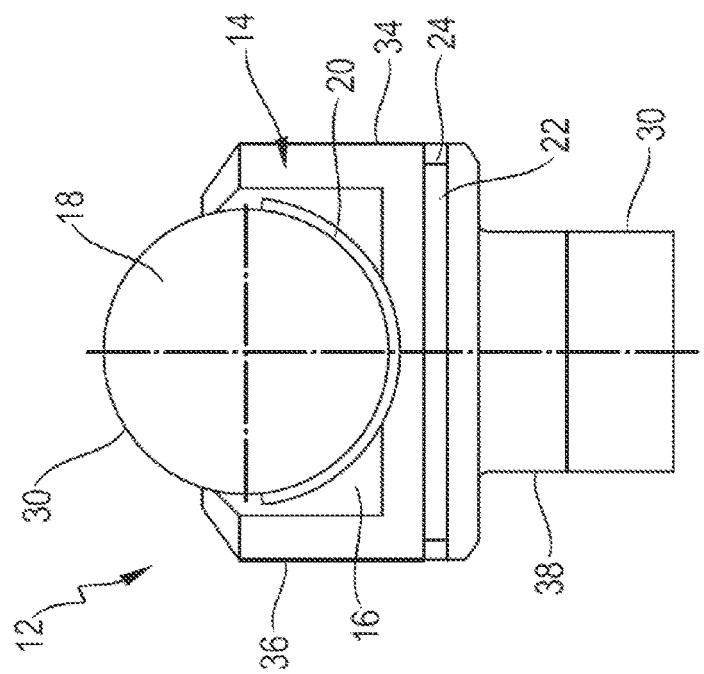
FIG. 2 shows a piston unit from FIG. 1 having a tribological system according to the disclosure in a view perpendicular to the piston axis.

The tribological system will be described below with reference to FIG. 2, which shows one of the piston units 12 from FIG. 1. As explained above, the rolling element 18 designed as a roller is mounted in the bearing shell 20, which is manufactured from a bearing material having a PEEK/PTFE matrix. The rolling element 18 has a surface 30 which is in direct contact with the bearing shell 20 in the installed state. The roller 18 slides in the bearing shell and rolls on the cam curve. In order to achieve a minimum frictional resistance between the rolling element 18 and the bearing shell and the cam curve 28, the surface of the rolling element 18 is polished. In this illustrative embodiment, the polished surface of the rolling element 18 is limited to the circumferential surface of the circular-cylindrical rolling element 18.

As explained, the piston is embodied as a stepped piston with a piston journal 30 set back radially, which dips into the guide bore 10 of the cylinder 8 according to FIG. 1. The space in front of the piston journal 30 and the annular space 32 are connected permanently to one another by piston journal flats extending perpendicularly to the axis of the roller 18, for example, and therefore the effective piston surface is given by the diameter of the piston in the widened piston section 34 radially adjoining the piston journal 30, in which section the groove 22 for receiving the piston ring 24 is also formed. According to the disclosure, both the outer circumferential surface 36 of the piston section 34 and the circumferential surface 38 of the piston journal 30 are polished outside the flats.

The vibration polishing method described at the outset can be used as a polishing method here, in which the piston is brought to the required surface finish in a plurality of successive polishing steps. Of course, other suitable polishing methods, e.g. lapping, polishing with polishing disks or the like on automatic lathes or the abovementioned vibration polishing method, in which finish grinding takes place in a vibrating container, can also be used.

It is important that the surface areas of the piston 14 which are in sliding contact with the circumferential surfaces of the cylinder bore, i.e. the main bore 8 and the guide bore 10, are polished.

One special feature of the illustrative embodiment is that the sliding surfaces of the cylinder, i.e. the circumferential surfaces of the main bore 8 and of the guide bore 10, are not polished and thus have a comparatively uneven surface which promotes the formation of a lubricating film. It is particularly preferred that the sliding surfaces of the rotor 4 embodied as a cylinder block or the entire rotor should be treated by the QPQ® method. In the installed state, the cylinder sliding surface is accordingly formed by a magnetite layer, which is comparatively rough and porous. The other part of the sliding pair is formed by the polished piston surface. This piston surface can likewise be treated by nitrocarburizing before polishing in order to improve wear resistance. After quenching with cooling and oxidation, there is then only a polishing step, however, in contrast to the prior art explained at the outset, with the result that the piston is installed with its polished sliding surfaces.

Figure 3:
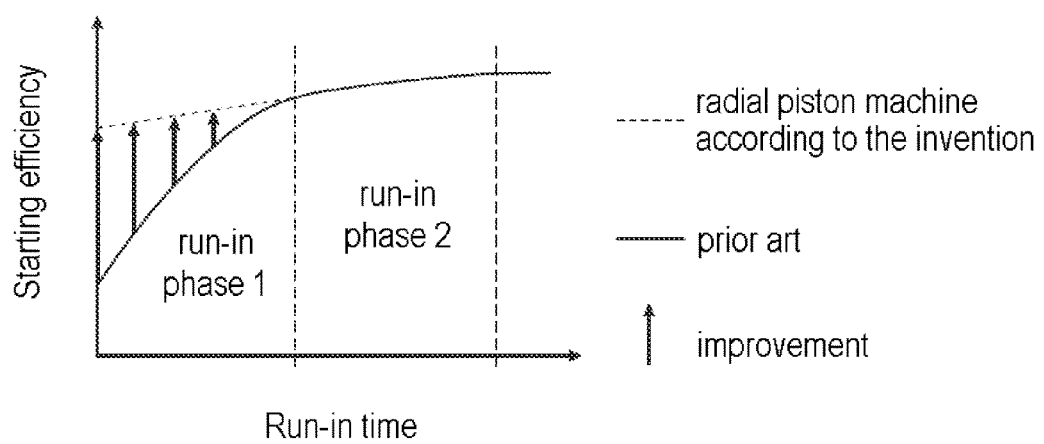
FIG. 3 shows a diagram intended to illustrate the improved starting behavior of a radial piston machine according to the disclosure.

The effectiveness of this special structure of the sliding pairs of the piston unit and the hydrostatic radial piston machine embodied therewith is explained with reference to FIG. 3. This shows a diagram in which the starting efficiency is shown against the running time of the radial piston machine. A high starting efficiency represents a low starting torque and thus an improved mechanical efficiency of the radial piston motor. Here, the term "running time" should be taken to mean the time which the motor requires for conventional running in of the motor on the production line. The origin of the X axis represents a new radial piston motor in the installed state, while the end of the X axis represents the time within which the radial piston motor is completely run in.

The solid lines represent the run-in behavior (run-in time) of a conventional radial piston motor. It can be seen that the starting efficiency in the case of a new radial piston motor is comparatively low and reaches a maximum only after a certain running time. A dashed line represents the starting efficiency of a radial piston motor according to the disclosure or of a radial piston machine according to the disclosure. It can be seen that the starting efficiency is considerably higher, even when new, than in the case of a conventional radial piston motor and that only a slight improvement in the starting efficiency can be achieved by a run-in process. This improvement is possible only in the region of the running time which is denoted by run-in phase 1 in the diagram. Following this run-in phase, the two curves are practically congruent, i.e. the starting torque of the conventional motor and the starting torque of the motor according to the disclosure are approximately the same in run-in phase 2. The improvement which can be achieved in this phase is determined primarily by the run-in process in the region of the rolling support for the rolling element 18.

It is clearly apparent that the starting torque can be improved by more than 50% over a conventional motor in run-in phase 1 by means of the measures according to the disclosure. Since, when new, the motor according to the disclosure with the polished pistons 14 already has a starting torque which the conventional motor achieves only after a run-in time of approximately 14 hours, it is possible in principle to dispense with the time-consuming process of running in the radial piston machine during manufacture.

In particular, the surface 30 of the rolling element 18 is also polished by a manufacturing process, giving it a maximum peak-to-mean-line height Rpmax of 0.20±0.05 μm, a mean roughness Ra of 0.03±0.01 μm, and a reduced peak height Rpk of 0.04±0.02 μm. The core peak to valley height Rk is 0.10±0.01 μm and the averaged or reduced score depth Rvk is specified as 0.08±0.02 μm. Moreover, the polished rolling element surface has a material ratio Rmr of 30%±10%, measured at a cutting depth of −0.05 μm. With each one of the surface finish specifications listed above, the friction coefficient can already be reduced. It is only for a particularly low friction coefficient that the surface 30 of the rolling element 18 can be polished in such a way that all the specifications listed above can be achieved.

In this way, a polished piston 14 with the rolling element receptacle or bearing shell 20 manufactured from a bearing material having a PEEK/PTFE matrix and with the polished rolling element 18 rotatably mounted therein forms a tribological system which, while having a minimal run-in time, is distinguished by a particularly low friction coefficient, in particular by a low static friction coefficient.

The piston unit 12 does not necessarily have to be used in a radial piston machine 1 with piston support at the outside but can also be used to advantage in other technical applications. In particular, use in radial piston machines of some other type of construction that does not have piston support at the outside is also conceivable. Use in technical systems which are not radial piston machines is also conceivable.

A piston unit and a radial piston machine embodied with at least one such piston unit are disclosed. According to the disclosure, a piston of the piston unit is polished.

What is claimed is:

1. A hydrostatic radial piston machine comprising
at least one piston unit including:
   a piston body having an outer circumferential surface; and
   at least one rolling element rotatably mounted in a rolling element receptacle of the piston body, the outer circumferential surface of the piston body being polished in an installed state such that the outer circumferential surface has a mean roughness Ra of 0.03±0.02 μm; and
a cam ring on which the at least one rolling element is configured to roll during operation of the radial piston machine,
wherein the piston unit is guided in a cylinder bore of a cylinder block,
wherein the cylinder bore has an unpolished surface layer in the installed state of the piston body, and
wherein the cylinder bore is pretreated by nitrocarburization and subsequent cooling/oxidation, resulting in the formation of a magnetite layer as the unpolished surface layer.

2. The hydrostatic radial piston machine according to claim 1, wherein the polished outer circumferential surface of the piston body and the unpolished surface layer of the cylinder bore are in sliding contact with one another such that the cylinder bore guides the outer circumferential surface of the piston body.

\* \* \* \* \*